Figure 1:
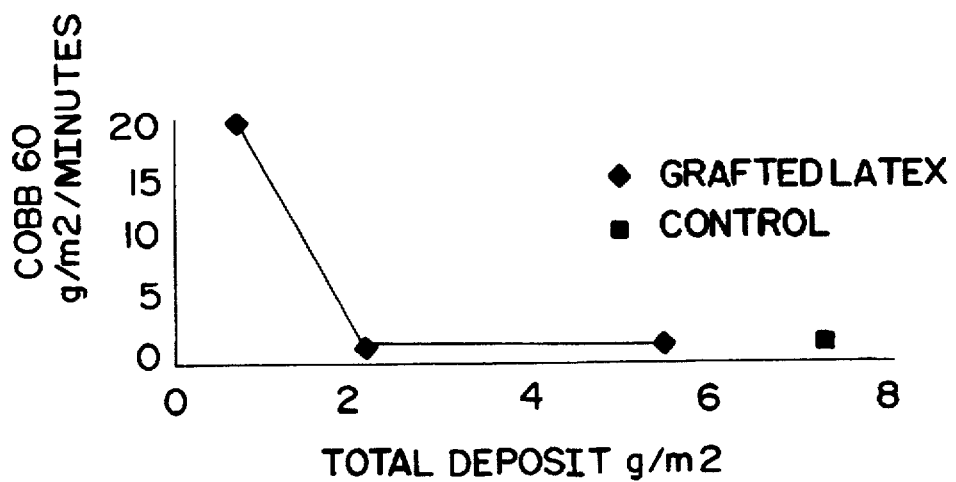

United States Patent [19]
Ariagno et al.

[11] Patent Number: 5,767,206
[45] Date of Patent: Jun. 16, 1998

[54] USE, AS ANTIADHESIVES AGENT AND/OR WATER REPELLENTS, OF GRAFTED FUNCTIONALIZED POLYORGANOSILOXANES

[75] Inventors: Daniel Ariagno, Craponne; André Lievre, Saint-Genis Laval; Thérésa Michael, Levallois Perret; Joël Richard, Chantilly, all of France

[73] Assignee: Rhone-Poulenc Chimie, Courbevoie Cedex, France

[21] Appl. No.: 862,423

[22] Filed: May 23, 1997

Related U.S. Application Data

[63] Continuation of Ser. No. 585,575, Jan. 16, 1996, abandoned.

[30] Foreign Application Priority Data

Jan. 16, 1995 [FR] France ................... 95 00611

[51] Int. Cl.⁶ ................... C08F 283/00; C08G 77/04
[52] U.S. Cl. ................... 525/479; 528/25; 528/26
[58] Field of Search ................... 525/479; 528/26, 528/25

[56] References Cited

U.S. PATENT DOCUMENTS

| | | | |
|---|---|---|---|
| 3,575,910 | 4/1971 | Thomas | 528/26 |
| 4,313,988 | 2/1982 | Koshar et al. | 428/40 |
| 5,032,460 | 7/1991 | Kantner et al. | 428/449 |
| 5,405,691 | 4/1995 | Noda et al. | 428/331 |

FOREIGN PATENT DOCUMENTS

| | | |
|---|---|---|
| 0 273 448 A2 | 7/1988 | European Pat. Off. |
| 0 541 395 A1 | 5/1993 | European Pat. Off. |
| 0 635 526 A1 | 1/1995 | European Pat. Off. |
| 42 40 108 A1 | 6/1994 | Germany |

*Primary Examiner*—Karen A. Dean
*Attorney, Agent, or Firm*—Burns, Doane, Swecker & Mathis, L.L.P.

[57] ABSTRACT

The present invention relates to the use, as antiadhesive agents and/or water repellents, of grafted functionalized polyorganosiloxanes consisting of grafted copolymer moieties, derived from at least one ethylenically unsaturated monomer which may be polymerized via a radical route and from a functionalized polyorganosiloxane (I) containing similar or different moieties (I) of formula (I)

$$R_a Y_b X_c Si O_{(4-a-b-c)/2} \quad (I)$$

in which formula:
R=$C_1$–$C_{18}$ alkyl, X=$C_1$–$C_{20}$ alkylated epoxyfunctional residue, Y=acrylate, and a, b, c=0, 1, 2 or 3 with a+b+c=0, 1, 2 or 3.

These grafted functionalized POSs are used in the form of an aqueous dispersion for the production of an antiadhesive coating on a solid support, preferably chosen from sheets of polymer material or of paper, cardboard or the like, from tapes which are adhesive on their non-adhesive side, from intercalating films of double-sided adhesive tapes or from woven or nonwoven fibrous supports and/or composites or non-composites.

17 Claims, 2 Drawing Sheets

USE, AS ANTIADHESIVES AGENT AND/OR WATER REPELLENTS, OF GRAFTED FUNCTIONALIZED POLYORGANOSILOXANES

This application is a continuation of application No. 08/585,575 filed Jan. 16, 1996, now abandoned.

The field of the present invention is that of the applications of specific copolymers comprising at least one silicone of functionalized polyorganosiloxane (POS) type and at least one ethylenically unsaturated repeating unit which may be polymerized via a radical route. Within the context of the invention, attention is focused more particularly on the antiadhesive and/or water-repellent functionalities of these copolymers. Even more precisely, the invention is directed towards antiadhesive agents and/or water repellents based on the said copolymers as they are or in the form of an aqueous dispersion, as well as the compositions, containing these agents, which are useful for the production of antiadhesive and/or water-repellent coatings for any solid support (e.g. paper, cardboard, woven or nonwoven fibrous materials).

Siloxane-acrylate copolymers and aqueous dispersions thereof are already known, in particular from U.S. Pat. No. 3,575,910. This document describes in particular an acrylate-grafted siloxane copolymer, in which the siloxane comprises Si-Me, Si-Phe, Si-Vi, Si-diphe and Si-diMe moieties (Me=—$CH_3$; Phe=$C_6H_5$; Vi=vinyl). In emulsion with a solids content of 10%, these copolymers are tested as antiadhesive coatings for Kraft paper. The results obtained are relatively unsatisfactory.

European Patent Application No. 0,541,395 describes coating agents obtained from an aqueous emulsion of grafted polysiloxane-polyvinyl copolymers, which agents distinguish themselves by the presence of specific siloxane units. In particular, the coatings produced have modest properties of non-wettability and of behaviour towards water. In addition, they prove to be relatively expensive. In reality, these polyorganosiloxanes are cyclic in nature and contain grafts formed by methacrylic, epoxyalkyl and alkyl moieties in particular. The comonomer associated with this cyclopolysiloxane monomer is of the acrylate or styrene type, for example. The antiadhesive properties of these grafted vinyl-functionalized cyclosiloxane copolymers have been compared with those of control cyclopolysiloxanes. Although there is admittedly a difference in antiadhesive performance, this antiadhesion would benefit from being even more pronounced.

It emerges from this review of the state of the art that the antiadhesive functionality of POS copolymers grafted with an ethylenically unsaturated monomer (e.g. acrylate) is known but that, hitherto, low antiadhesive performance levels were considered satisfactory. Besides this shortcoming, it would appear that the known siloxane-grafted unsaturated monomer copolymers have no advantageous properties of non-wettability or of behaviour towards water. Lastly, these functional deficiencies are unfortunately not compensated for by economic advantages.

In this state of knowledge, one of the essential aims of the invention is to provide a novel antiadhesive agent and/or water repellent which offers a good technical compromise between the properties of antiadhesion, of non-wettability and of behaviour towards water, on the one hand, and the cost price, on the other hand.

Another aim of the invention is to provide a novel use of a POS-unsaturated comonomer copolymer, in technical applications, which is directed not only towards antiadhesion but also towards related properties of hydrophobicity and of oleophobicity, i.e. of non-wettability and of behaviour towards water, which are all just as essential.

Another aim of the invention is to provide a solid support, for example one made of paper, cardboard or the like or alternatively made of synthetic polymer (sheet) of woven or nonwoven fibrous material, coated with at least one antiadhesive and/or water-repellent layer based on the aboveintended novel agent.

Another essential aim of the invention is to provide a novel use of a known POS-unsaturated monomer copolymer, as a novel antiadhesive agent and/or water repellent, which is entirely economically competitive.

These aims, inter alia, are achieved by the present invention which relates, firstly, to the use, as antiadhesive agents and/or water repellents, of grafted functionalized polyorganosiloxanes comprising grafted copolymer moieties, derived from at least one ethylenically unsaturated monomer which may be polymerized via a radical route and from a functionalized polyorganosiloxane (I) containing similar or different moieties (I) of formula (I) below:

$$R_a Y_b X_c SiO_{(4-a-b-c)/2} \qquad (I)$$

in which formula:

the symbols R are similar or different and represent a linear or branched $C_1$–$C_{18}$ alkyl group, a linear or branched $C_2$–$C_{20}$ alkenyl group, or a $C_6$–$C_{12}$ aryl or aralkyl group, optionally substituted, preferably with halogen atoms;

the symbols X are similar or different and represent a reactive function linked to a silicon atom by an Si—C or Si—O—C bond;

the symbols Y are similar or different and represent an ethylenically unsaturated hydrocarbon residue which may contain one or more hetero element(s) O or N, this residue being linked to a silicon atom of the moiety of formula (I) by an Si—C bond and being capable of reacting via a radical route with the said ethylenically unsaturated monomer(s);

a, b and c are equal to 0, 1, 2 or 3;

a+b+c=0, 1, 2 or 3;

the level of $SiO_{4/2}$ moieties being less than 30 mol %;

the number of moieties of formula (I) in which the silicon atom bears a function X and/or a residue Y being such that the said polyorganosiloxanes contain:

at least 1 milliequivalent, preferably from 5 to 500 milliequivalents and even more preferably from 5 to 100 milliequivalents, of functions X per 100 grams of polyorganosiloxane of formula (I), at least 5 milliequivalents, preferably from 10 to 500 milliequivalents, of residues Y per 100 grams of polyorganosiloxane of formula (I), characterized in that the reactive function X of (I) is an epoxyfunctional hydrocarbon group containing from 2 to 20 carbon atoms.

The Applicant has, to its credit, updated a novel use of POS-ethylenically unsaturated monomer copolymers specifically selected from those in which the repeating POS unit comprises, besides the (ethylenically unsaturated) reactive function for copolymerization, at least one other pendant graft X containing at least one epoxide function. This limited group of grafted copolymers has been judiciously isolated, surprisingly and unexpectedly, after considerable work and research.

These copolymers are endowed with a whole range of properties combining with those of antiadhesion and of water repellency, which are moreover optimally expressed within the context of this novel original use in accordance with the invention.

This water-repellent property, related to the antiadhesion, is particularly appreciable since it is the source of the non-wettability (hydrophobicity/oleophobicity), and subsequently of functions of anti-soiling or anti-spoiling type for fibrous or non-fibrous supports of any nature, which would comprise the copolymers in question, for example, in the form of a surface coating (e.g. antiadhesive coatings for papers/cardboards). Lastly, since this novel use involves known and available POS-ethylenically unsaturated monomer copolymer products, it is economical.

The characteristic water-repellent property of the invention is not incompatible with satisfactory properties of "printability" and of "writability" for coatings containing the copolymer products according to the invention.

In accordance with a preferred embodiment of the invention, the grafted functionalized polyorganosiloxane which is selected has a linear structure.

Advantageously, the linear POSs have chain lengths of from 10 to 30 silicon atoms, preferably 15 to 25, and even more preferably of about 20.

The polyorganosiloxanes containing the moieties of formula (I) may, in their linear form, have up to 50% by weight of branching (moieties other than "D" moieties), or three-dimensional polymers (resin).

To continue the non-limiting definition of the POS-unsaturated monomer copolymers, it is specified that the residue Y which they contain in (I) is a group -y-Y', where:

y represents a linear or branched $C_1-C_{18}$ polyvalent alkylene radical, optionally extended by divalent ethyleneamine or polyethyleneamine residues, or a $C_1-C_3$ oxyalkylene or polyoxyalkylene radical optionally substituted with a hydroxyl, hydroxycyclohexylene, etc. radical, Y' represents an alkenylcarbonyloxy radical.

Examples of alkenylcarbonyloxy radicals Y' which may be mentioned are acryloxy, methacryloxy, etc.

By way of illustration of y, the following will be mentioned:

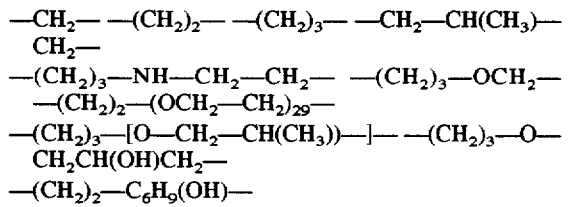

The epoxyfunctional hydrocarbon groups X may be, inter alia, 3-glycidoxypropyl, 4-ethanediyl(1,2-epoxycyclohexyl), etc.

This reactive function X is capable of reacting chemically by condensation or polycondensation or dehydrogenopolycondensation, optionally under the action of the heat of radiation, of an electron beam and/or with the aid of a catalyst.

Among the radicals R featured in the formula (I) which may be mentioned are methyl, ethyl, octyl, trifluoropropyl, vinyl, hexenyl, phenyl, etc. groups. Preferably, at least 80 mol % of the said radicals R represent a methyl group.

Among the ethylenically unsaturated monomers from which the said grafted functionalized polyorganosiloxanes are derived, mention may be made of those of the type:

monoethylenically unsaturated esters of saturated carboxylic acid (vinyl acetate, propionate, butyrate, stearate, benzoate, etc.), saturated esters and monoethylenically unsaturated carboxamides (acrylate and methacrylate of $C_1-C_{20}$ alkyl such as methyl, butyl, heptyl, propyl, heptadecanyl, etc., acrylamide, methacrylamide, etc.), monoethylenically unsaturated nitriles (acrylonitrile, methacrylonitrile, etc.), monoethylenically unsaturated carboxylic acids (acrylic acid, methacrylic acid, itaconic acid, maleic acid, etc.), hydroxyalkyl or aminoalkyl esters of monoethylenically unsaturated carboxylic acids (hydroxyethyl, hydroxypropyl, etc. acrylate, 2-aminoethyl methacrylate, etc.), vinylaromatic monomers (styrene, vinyl-toluene, etc.), dicyclopentadienyl acrylate or methacrylate, etc.

Given their preferred mode of preparation, the polyorganosiloxanes used according to the invention are advantageously in the form of a reactive, stable aqueous dispersion generally having a solids content of about 5 to 60%, preferably of about 25 to 50%, by weight.

These aqueous dispersions used according to the invention may be obtained by radical polymerization in aqueous emulsion or in microsuspension of at least one ethylenically unsaturated monomer in the presence of the said functionalized polyorganosiloxane containing similar or different moieties of formula (I).

The respective amounts of ethylenically unsaturated monomer and of functionalized polyorganosiloxane which may be used correspond to a monomer/polyorganosiloxane weight ratio of about 98-50/2-50, preferably of about 95-75/5-25.

The polymerization operation is performed in the presence of emulsifying agents and a polymerization initiator via a radical route.

Among the emulsifying agents which may be used, alone or as a mixture, mention may be made of standard anionic agents such as fatty acid salts, alkyl sulphates, alkyl sulphonates, alkyl aryl sulphonates, sulphosuccinates, alkyl phosphates of alkali metals, hydrogenated or nonhydrogenated salts of abietic acid, nonionic agents such as polyethoxylated fatty alcohols, polyethoxylated and optionally sulphated alkylphenols, polyethoxylated fatty acids, etc.

These emulsifying agents may be used at a proportion of 0.1 to 3% by weight relative to the total weight of ethylenically unsaturated monomer and functionalized polyorganosiloxane.

The initiators which may be used are of the water-soluble or water-dispersible type, for instance hydroperoxides such as aqueous hydrogen peroxide, cumene hydroperoxide, tert-butyl hydroperoxide and diisopropylbenzene hydroperoxide, persulphates such as sodium persulphate, potassium persulphate, ammonium persulphate, etc.

These initiators may be used at a proportion of 0.01 to 4%, preferably of 0.05 to 2%, by weight relative to the total weight of ethylenically unsaturated monomer and functionalized polyorganosiloxane.

These initiators are optionally combined with a reducing agent, such as bisulphites or sodium formaldehydesulphoxylate, polyethyleneamines, sugars such as dextrose and sucrose, and metal salts of ascorbic acid. The amounts of reducing agent used may range up to 3% by weight relative to the weight of the monomer(s)+functionalized polyorganosiloxane mixture.

Chain-limiting agents may optionally be present in proportions ranging from 0 to 3% by weight relative to the monomer(s)+functionalized polyorganosiloxane mixture. They are generally chosen from mercaptans such as N-dodecylmercaptan and tert-dodecylmercaptan; cyclohexene; halogenated hydrocarbons such as chloroform, bromoform, carbon tetrachloride and carbon tetrabromide; α-methylstyrene dimers, etc.

The polymerization operation may be performed according to several different procedures.

A first embodiment consists in homogenizing an ethylenically unsaturated monomer(s)/functionalized polyorganosiloxane mixture in a water/emulsifying agent mixture, and polymerizing in the presence of a water-soluble or water-dispersible initiator, at a temperature at least equal to that of decomposition of the said initiator.

A second embodiment consists in introducing an ethylenically unsaturated monomer(s)/water-soluble or water-dispersible initiator mixture into an aqueous emulsion of functionalized polyorganosiloxane, and polymerizing at a temperature at least equal to that of decomposition of the initiator.

Another embodiment consists in pre-emulsifying an ethylenically unsaturated monomer(s)/functionalized polyorganosiloxane/organosoluble initiator mixture in a water/emulsifying agent mixture, and polymerizing at a temperature at least equal to that of decomposition of the said initiator.

Examples of organosoluble initiators which may be mentioned are organic peroxides such as lauroyl peroxide, benzoyl peroxide, tert-butyl peroxide, etc.; azonitriles such as azobisisobutyronitrile, etc.

The polymerization operation generally takes place at a temperature of about 60° to 85° C.

For further details on the structure and the preparation of these functionalized polyorganosiloxanes used within the context of the invention, reference will be made to European Patent Application No. 0,635,526 published on 25 Jan. 1995 and which is incorporated in the present Application in its entirety by way of reference.

As regards the use in accordance with the invention of the abovesaid functionalized POS-ethylenically unsaturated (e.g. acrylate) comonomer copolymers, provision is made in particular to use them in the form of an aqueous dispersion, as antiadhesive agents, in a coating composition for a solid support.

This application is more specifically directed towards antiadhesive coatings, of any nature, on solid supports of any type.

Examples of solid supports which may be mentioned are:

sheets of a synthetic polymer material (for example: polyethylene, polyethylene terephthalate), of paper, cardboard or the like, tapes which are adhesive on their non-adhesive side, intercalating films of double-sided adhesive tape, woven or nonwoven fibrous supports (e.g. textiles) and/or composites or noncomposites.

In this application, the aqueous coating dispersions comprise an amount of polyorganosiloxane <40% by weight relative to the total, preferably between 5 and 25% by weight and, even more preferably, of about 15% by weight.

The solids content of the emulsion is itself less than or equal to 60%, preferably between 30 and 50%, by weight and even more preferably of the order of 40% relative to the total mass.

The coating is performed conventionally by "spreading" on the support, followed by drying of the coated layer by heating to a temperature of between 100° and 200° C., preferably of about 150° C. It goes without saying that several superimposed layers may be produced. Those skilled in the art are entirely capable of varying the level of deposition according to the intended application, for example within a range of between 2 and 8 g of copolymer-based coating composition per m².

This application according to the invention thus makes it possible to obtain a solid support at least partly coated with the aqueous dispersion as defined above, the said solid support constituting another subject of the present invention.

In this application, the copolymers selected act, in particular, both as antiadhesive agents and/or as water repellents. The coatings which they make it possible to obtain impart anti-soiling and anti-spoiling properties to the coated support by virtue of their properties of non-wettability, which in particular afford them a certain oleophobicity. These coatings also have the advantage of being printable, writable and markable with inks of any nature.

It goes without saying that the typical basic antiadhesive and water-repellent properties of the invention may be expressed in each application, but are not necessarily both exploited together. Indeed, in certain cases only one of the two may be useful.

The non-limiting examples which follow will make it possible to gain a better understanding of the invention and to grasp some of the advantages and embodiment variants thereof.

EXAMPLES

Example I

Characterization of the functional properties of a selected silicone-grafted latex (SGL) which may be exploited, in accordance with the invention, in a use for the production of an anti-adhesive coating on paper:

I.1 Equipment used

The acrylic copolymer grafted with silicones used is in the form of an emulsion at a solids content of 40% (silicone-grafted latex or SGL), this solids content having the following formulation:

Methyl methacrylate . . . 35 parts by weight

Butyl acrylate . . . 45 parts by weight

Acrylic acid . . . 5 parts by weight

Acrylate-grafted polydimethylsiloxane (PDMS) oil . . . 15 parts by weight.

This POS-acrylate copolymer (or SGL) is obtained as described below:

An unsaturated organopolysiloxane oil assaying at 31 meq/100 g of glycidyl ether functions, of the following average formula:

$$(CH_3)_3Si-O-\left[\begin{array}{c}CH_3\\|\\Si-O\\|\\CH_3\end{array}\right]_{36.8}-\left[\begin{array}{c}CH_3\\|\\Si-O\\|\\(CH_2)_3\\|\\O\\|\\CH_2\\\diagdown_O\diagup\end{array}\right]_{1.8}-\left[\begin{array}{c}CH_3\\|\\Si-O\\|\\(CH_2)_3\\|\\O\\|\\CH_2\\|\\CH-OH\\|\\CH_2-O-C-C=CH_2\\\quad\;\;\|\;\;|\\\quad\;\;O\;\;H\end{array}\right]_{15}-Si-(CH_3)_3$$

is prepared from the following reactants:

100 g of a polyorganosiloxane oil assaying at 290 meq/ 100 g of glycidyl ether functions, of formula:

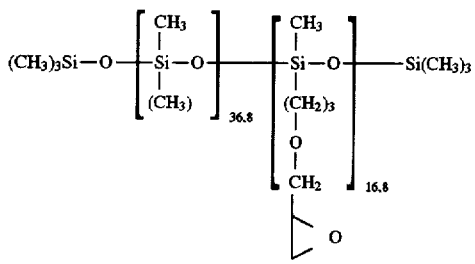

21 g of acrylic acid 0.03 g of hydroquinone (thermal-polymerization inhibitor)

0.2 g of 1,4-diazabicyclo[2.2.2]octane 50 g of toluene.

The reaction is performed in a reactor under nitrogen, the temperature of the reaction medium being brought to and maintained at 100° C. until a degree of conversion of the oxirane function of about 90% is observed.

The solvents and the unreacted acrylic acid are removed by distillation under reduced pressure (266 Pa).

Pre-emulsion:

The following are mixed together in a 1 l beaker:

141 g of methyl methacrylate, 135 g of methyl acrylate, and 9 g of acrylic acid.

15 g of unsaturated organosiloxane oil prepared above are added with stirring.

The medium is left stirring until dissolution is complete.

180 g of deionized water and 3.9 g of a 38.5% by weight aqueous solution of sodium dodecylbenzenesulphonate (Na-DBS) are mixed together in a beaker.

The acrylic monomers/diorganopolysiloxane mixture is introduced into this solution with stirring. The mixture obtained is emulsified using an ULTRA-TURRAX® type mixer (marketed by Prolabo) for 5 minutes at 20,000 revolutions/minute. A pre-emulsion of the monomers and of the functionalized silicone oil is thus obtained.

Polymerization:

198.5 g of water are introduced into a one-liter reactor and are maintained at 82° C. with stirring.

The following are then added:

20 g of the preemulsion prepared above, 0.90 g of azmonium persulphate.

After waiting 15 minutes for the reaction to be initiated, the remainder of the preemulsion, i.e. 463.90 g, is added over a period of 4 hours. The mixture is left to cure at 82° C. for 30 minutes. It is cooled to 60° C. and 0.42 g of tert-butyl hydroperoxide and 0.18 g of $Na_2S_2O_5$ are added. The temperature is maintained at 60° C. for 30 minutes and the mixture is then cooled to room temperature. It is neutralized with dilute 20% aqueous ammonia solution. A latex with a solids content of 40% is obtained, this latex exhibiting very good stability on storage.

I.2. Use of this latex for the production of an antiadhesive coating.

The latex (SGL) obtained in 1.1. is used as it is for the thin-layer coating of a cellulosic support of Kraft paper type with a basis weight=70 g/m².

This use was carried out on a pilot coating machine.

The coating was carried out using the "Meyer bar" technique and drying of the coated layer obtained by passage through an oven 6 m long heated to 150° C. The throughput was 40 m/min.

Various SGL deposits were made on the support paper.

A coating control test was carried out with a latex of styrene butadiene type marketed by the company Rhône Poulenc under the name Rhodopas200 SB023 (registered trademark).

A—DROP ANGLE

A first characterization of the thermodynamic properties of the surfaces of the coatings is made by means of the technique of measuring the angle of a drop of deposited water.

The test was compared with the control.

The results are given below:

|  | Drop angle θ(°) |
|---|---|
| Control | 115.4 |
| Test 3 | 118 |

These results show that the SGL-coated surface becomes wet less readily than the control.

B—BEHAVIOUR TOWARDS WATER

An evaluation of the water repellency of the coated surfaces was made by a COBB/60 measurement (NF method Q 03-035).

The results reported in the curve COBB 60=f (total deposit), represented in the attached FIG. 1, show that the water-repellent power of the grafted latex is at least equivalent to that of the control latex.

C—ANTIADHESION

An evaluation of the antiadhesive power of the coatings was made according to the FINAT 3 method using an adhesive tape of Tesa brand Ref. 4651.

Figure 2:
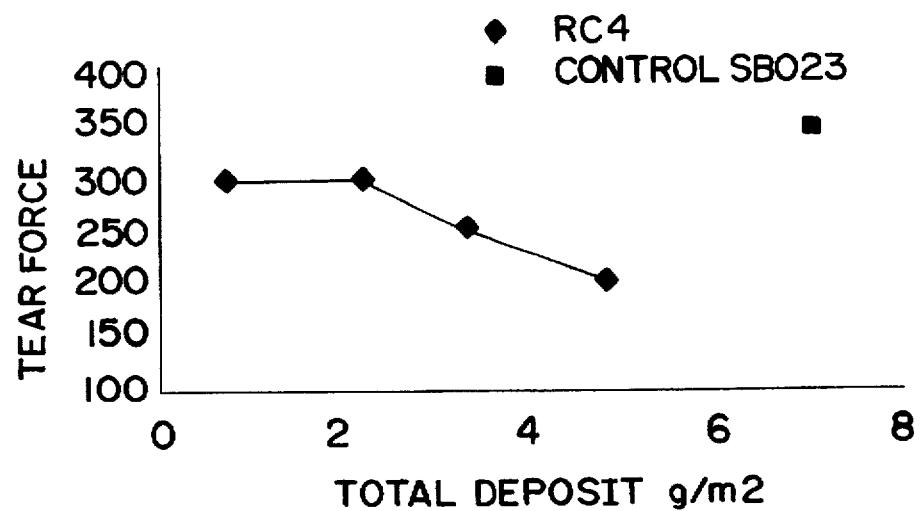

The results reported on the curve-Tear force=f (total deposit), represented in the attached FIG. 2, show that the coatings made with the grafted latex give the support a much better antiadhesive nature than the control.

D—COMMENTS:

The above results demonstrate that a support such as a Kraft paper, for example, coated with the silicone-grafted latex shows an improvement in the water repellency/ antiadhesion compromise when compared with a styrene butadiene latex.

This good compromise of performances provided by the SGL could, for example, find a use in antiadhesive and/or water-repellent coatings for porous supports, paper/cardboard supports, as an antiadhesive agent for nonwoven fibrous supports (anti-soiling-anti-spoiling).

Example II

Effect of the concentration of POS in the SGL copolymer within the context of a use of the paper antiadhesive coating II.1 Materials used The acrylic copolymers grafted with various levels of silicone which are used are in the form of an emulsion with a solids content of 40% (silicone-grafted latex or SGL). The formulations of these solids contents are as follows:

| methyl methacrylate | 52 p | 47 p | 47 p | 40 p | 35 p |
|---|---|---|---|---|---|
| butyl acrylate | 45 p | 45 p | 45 p | 45 p | 45 p |
| acrylic acid | 3 p | 3 p | 3 p | 5 p | 5 p |
| acrylate-grafted PDMS oil | 0 p | 3 p | 5 p | 10 p | 15 p |

The PDMS oil is the same as that of Example I.

II.2 Use of these various latices for the production of antiadhesive coatings

The implementation consisted in coating, manually and in a thin layer, these products, after dilution in water, onto a cellulosic support of paper type using the "Meyer bar" technique.

The coatings were dried by passage through a 30°/130° C. ventilated oven.

General formulation of the coating baths:

| Latex or silicone-grafted latex | 50 p |
|---|---|
| WATER | 50 p |

A—BEHAVIOUR TOWARDS WATER:

An evaluation of the water repellency of the coated surfaces was made by a COBB 60 measurement (NF method Q 03-035).

Figure 3:
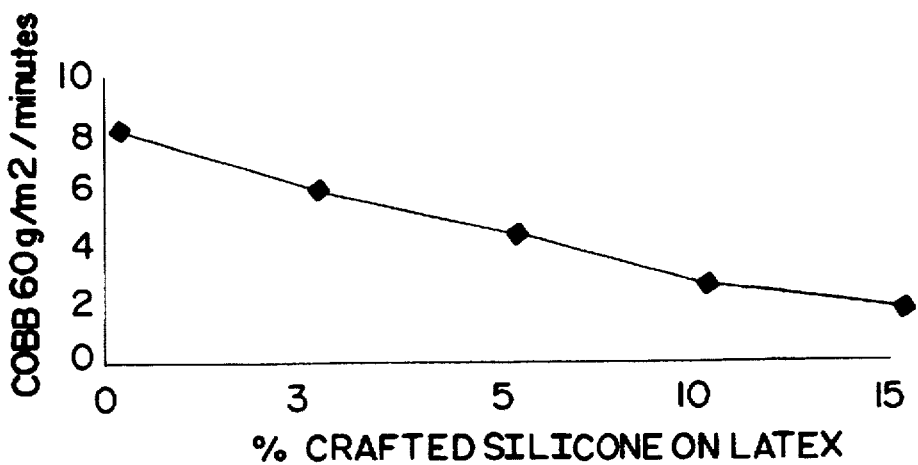

The results reported on the graph COBB 60=f (% of grafted silicone in the SGL), represented in the attached FIG. 3, show that the water-repellent power (behaviour towards water) of the control acrylic latex is markedly improved by silicone grafting, this improvement being proportional to the level of grafting: the COBB 60 decreases when the level of grafting increases.

B—ANTIADHESION:

An evaluation of the antiadhesive power of the coatings was made according to the FINAT 3 method using an adhesive tape of Tesa brand Ref. 4651.

Figure 4:
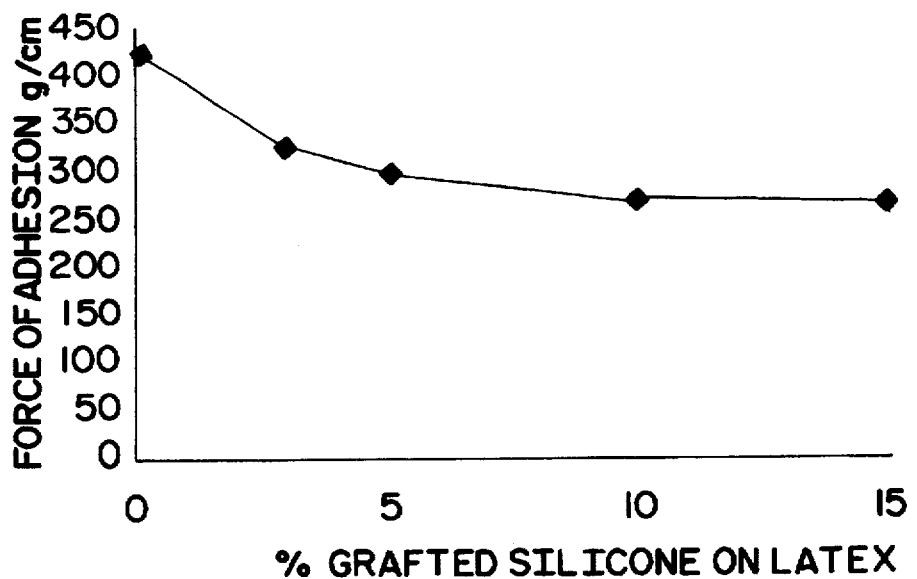

The results reported on the graph tear force=f (% of grafted silicone in the SGL) and represented in the attached FIG. 4 show that the grafting of silicone onto an acrylic latex markedly improves its antiadhesive performance, this improvement being in proportion to the level of grafting.

C—COMMENTS:

The above results demonstrate that the grafting of epoxy-functionalized silicone onto an acrylic latex substantially improves its water-repellent and antiadhesive power.

We claim:

1. A method for the preparation of a printable, writable and markable coating composition, in the form of an aqueous dispersion, comprising the steps of:

(a) making an aqueous emulsion comprising, as antiadhesive agents and/or water repellents, grafted functionalized polyorganosiloxanes comprising grafted copolymer moieties, derived from at least one ethylenically unsaturated monomer which is optionally polymerized via a radical route and which is selected from the group consisting of:
      (i) monoethylenically unsaturated esters of a saturated carboxylic acid;
      (ii) saturated esters or monoethylenically unsaturated carboxamides;
      (iii) monoethylenically unsaturated nitriles;
      (iv) monoethylenically unsaturated carboxylic acids;
      (v) hydroxyalkyl or aminoalkyl esters of monoethylenically unsaturated carboxylic acids;
      (vi) vinylaromatic monomers; and
      (vii) dicyclopentadienyl acrylate or methacrylate;
    and from a linear functionalized polyorganosiloxane (I) of the following formula (I):

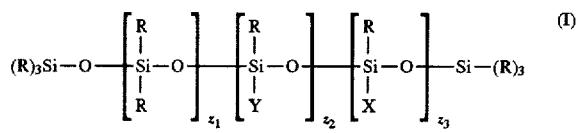

wherein:

R are the same or different and represent a linear or branched $C_1$–$C_{18}$ alkyl group, a linear or branched $C_2$–$C_{20}$ alkenyl group, or a $C_6$–$C_{12}$ aryl or aralkyl group, and is optionally substituted with halogen atoms;

X are the same or different and represent a reactive function linked to a silicon atom by an Si—C or Si—O—C bond and is an epoxy functional hydrocarbon group containing from 2 to 20 carbon atoms;

Y are the same or different and represent an ethylenically unsaturated hydrocarbon residue which optionally contains one or more hetero elements O or N, the residue being linked to a silicon atom of the moiety of formula (I) by an Si—C bond and being capable of reacting via a radical route with at least one ethylenically unsaturated monomer;

$Z_1$, $Z_2$ and $Z_3$ represent numbers of moieties;

the number of moieties $Z_2$ and $Z_3$ of formula (I) being such that the polyorganosiloxanes contain:

from 1 to 100 milliequivalents of functions X per 100 grams of polyorganosiloxane of formula (I); and from 10 to 500 milliequivalents of residues Y per 100 grams of polyorganosiloxane of formula (I).

2. The method according to claim 1, wherein the polyorganosiloxanes contain from 5 to 500 milliequivalents of functions X per 100 grams of polyorganosiloxane of formula (I).

3. The method according to claim 2, wherein the polyorganosiloxanes contain from 5 to 100 milliequivalents of functions X per 100 grams of polyorganosiloxane of formula (I).

4. The method according to claim 1, wherein the polyorganosiloxanes contain from 10 to 500 milliequivalents of residues Y per 100 grams of polyorganosiloxane of formula (I).

5. The method according to claim 1, wherein in the grafted functionalized polyorganosiloxanes, the ethylenically unsaturated monomer, from which the grafted functionalized polyorganosiloxanes are derived, is a monoethylenically unsaturated ester of saturated carboxylic acid, an amide or a saturated ester of a monoethylenically unsaturated carboxylic acid, a monoethylenically unsaturated nitrile, a monoethylenically unsaturated carboxylic acid, a hydroxyalkyl or aminoalkyl ester of a monoethylenically unsaturated carboxylic acid, a vinylaromatic monomer, dicyclopentadienyl acrylate or a methacrylate.

6. The method according to claim 1, wherein in the grafted functionalized polyorganosiloxanes, residue Y is represented by a group -y-Y', wherein:

y represents a linear or branched $C_1$–$C_{18}$ polyvalent alkylene radical, optionally extended by divalent ethyleneamine or polyethyleneamine residues, or a $C_1$–$C_3$ oxyalkylene or polyoxyalkylene radical optionally substituted with a hydroxyl or a hydroxycyclohexylene radical; and Y' represents an alkenylcarbonyloxy radical.

7. The method according to claim 1, wherein the grafted functionalized polyorganosiloxanes are formed by radical polymerization in aqueous emulsion or in microsuspension of at least one ethylenically unsaturated monomer in the presence of the functionalized polyorganosiloxane containing the same or different moieties of formula (I).

8. The method according to claim 7, wherein the respective amounts of ethylenically unsaturated monomers and of functionalized polyorganosiloxane used correspond to a monomer/polyorganosiloxane weight ratio in the range of from about 98-50/2-50.

9. The method according to claim 8, wherein the respective amounts of ethylenically unsaturated monomers and of functionalized polyorganosiloxane used correspond to a monomer/polyorganosiloxane weight ratio in the range of from about 95-75/5-25.

10. The method according to claim 7, wherein the polymerization operation is performed in an aqueous medium in the presence of emulsifying agents and of a polymerization initiator, via a radical route.

11. The method according to claim 10, wherein the grafted functionalized polyorganosiloxanes are formed by homogenizing an ethylenically unsaturated monomer/ functionalized polyorganosiloxane mixture in a water/ emulsifying agent mixture and polymerizing in the presence of a water-soluble or water-dispersible initiator, at a temperature at least equal to that of decomposition of the initiator.

12. The method according to claim 10, wherein the grafted functionalized polyorganosiloxanes are formed by introducing an ethylenically unsaturated monomer/water-soluble or water-dispersible initiator mixture into an aqueous emulsion of functionalized polyorganosiloxane and polymerizing at a temperature at least equal to that of decomposition of the initiator.

13. The method according to claim 10, wherein the grafted functionalized polyorganosiloxanes are formed by pre-emulsifying an ethylenically unsaturated monomer/ functionalized polyorganosiloxane/organosoluble initiator mixture, in a water/emulsifying agent mixture and polymerizing at a temperature at least equal to that of decomposition of the initiator.

14. A method for coating a solid support, comprising coating the solid support with a coating composition in the form of an aqueous dispersion prepared according to the method of claim 1, the coating composition being an antiadhesive agent and/or a water repellent.

15. The method according to claim 14, wherein the coating composition is an antiadhesive agent.

16. The method according to claim 15, wherein the solid support is selected from the group consisting of a sheet of polymer material, paper, cardboard, a tape which is adhesive on its non-adhesive side, an intercalating film of a double-sided adhesive tape, and woven or non-woven fibrous supports and/or composites or non-composites.

17. A solid support which is at least partially coated using an aqueous dispersion prepared according to the method of claim 1.

* * * * *